United States Patent [19]

Denmark et al.

[11] Patent Number: 5,564,470

[45] Date of Patent: Oct. 15, 1996

[54] VALVE ASSEMBLY

[75] Inventors: Martin W. Denmark, Telford; Stephen M. Buchan, Newport, both of England

[73] Assignee: BTR plc, London, England

[21] Appl. No.: 280,543

[22] Filed: Jul. 26, 1994

[30] Foreign Application Priority Data

Jul. 27, 1993 [GB] United Kingdom .................... 9315498
Oct. 1, 1993 [GB] United Kingdom .................... 9320289

[51] Int. Cl.⁶ .............................................. F16K 37/00
[52] U.S. Cl. .......................................... 137/554; 116/277
[58] Field of Search ............................ 137/554; 116/277; 251/315.12

[56] References Cited

U.S. PATENT DOCUMENTS

| | | | |
|---|---|---|---|
| 2,393,482 | 1/1946 | Smith | 137/554 X |
| 2,678,661 | 5/1954 | Roper et al. | 137/554 X |
| 3,161,204 | 12/1964 | Roy, Sr. | 251/315.12 X |
| 3,602,254 | 8/1971 | Fawkes | 137/554 |
| 4,469,127 | 9/1984 | Kitamura | 137/554 |
| 4,601,211 | 7/1986 | Whistler | 137/554 X |
| 4,647,003 | 3/1987 | Hilpert et al. | 137/554 X |
| 5,098,063 | 3/1992 | Ronzon | 137/554 |
| 5,150,103 | 9/1992 | Janssen-Weets | 340/686 |

FOREIGN PATENT DOCUMENTS

| | | |
|---|---|---|
| 0493921 | 7/1992 | European Pat. Off. . |
| 0550350 | 7/1993 | European Pat. Off. . |
| 3844020 | 6/1990 | Germany . |
| 9006743 | 10/1990 | Germany . |
| 2137313 | 10/1984 | United Kingdom . |
| 2172114 | 9/1986 | United Kingdom . |
| 2239934 | 7/1991 | United Kingdom . |
| WO8808497 | 11/1988 | WIPO . |
| WO9119168 | 12/1991 | WIPO . |

*Primary Examiner*—John Rivell
*Attorney, Agent, or Firm*—Watson Cole Stevens Davis, PLLC

[57] ABSTRACT

A valve assembly comprising a valve body, an obturator rotatably mounted in the body and a transducer connected to or located adjacent the obturator in order to determine the position thereof.

The transducer may comprise e.g. a potentiometer or a Hall effect device.

11 Claims, 6 Drawing Sheets

VALVE ASSEMBLY

BACKGROUND OF THE INVENTION

This invention relates to a valve assembly.

A valve assembly typically has a valve obturator e.g. a disc in a butterfly valve, a ball in a ball valve and a tapered plug in a plug valve, supported in a valve body. At one position a drive shaft extends through the valve body and drivably connects the obturator to a valve actuator. Rotation of the shaft by the actuator causes rotation of the obturator through a predetermined angle of e.g. 90° between open and closed positions. In a butterfly valve, the disc may be supported in the valve body at diametrically opposed positions. At one position, the drive shaft extends through the valve body and drivably connects the disc to the valve actuator, while at the other position a stub axle, fixed to the valve body, extends into a socket on the disc. An example of such a butterfly valve is illustrated and described in published European application EP-A-0493921.

In order to determine or monitor the position of the obturator it is known to provide a sensor with an indicator associated with the actuator. However, sometimes, because of wear, damage or other causes the position of the obturator is not accurately sensed or indicated.

SUMMARY OF THE INVENTION

It is the aim of the present invention to provide a valve assembly having means of directly monitoring the position of the valve obturator.

In accordance with the invention a valve assembly comprises a valve body, an obturator rotatably mounted within the body and capable of being rotated between open and closed positions, and an electrical transducer secured to the valve body and operable on rotation of the obturator, the position of said obturator being determined by the effect of said transducer on circuitry electrically connected thereto.

In one preferred embodiment of the invention the electrical transducer comprises a rotary potentiometer and in another, a Hall effect device.

The valve may comprise a butterfly valve and the obturator a valve disc having a pair of diametrically opposed mounting bosses each of which is provided with a blind bore open at the periphery of the disc. An actuator may be drivably connected to the drive shaft which is non-rotatably received by one of the blind bores. Conveniently a stub axle fixed relative to the valve body extends into the other of the blind bores and the disc is free to rotate on the stub axle. A spindle of the transducer may extend through a clearance bore in the stub axle and may be attached to the valve disc at the closed end of the blind bore which receives the stub axle by means of a flexible coupling.

Suitably, the stub axle extends from a through-bore in the base of the valve body the outer extent of which is plugged by a mounting plug which the stub axle abuts. The transducer may be mounted in or on the mounting plug disposed coaxially of the stub axle. To ensure correct location of the transducer the mounting plug may be adjustable axially and/or angularly of the through-bore.

The valve may comprise a ball valve, the obturator of which comprises a ball mounted for rotation about an axis and having a flexible coupling means to a drive shaft. The transducer may be connected to the ball at a position on the axis of rotation and diametrically opposite to the coupling.

The valve may comprise a tapered plug valve, the obturator of which comprises a tapered plug having a wide end and a narrow end mounted for rotation about an axis and connected directly to or via a flexible coupling to a drive shaft at one of the two ends. The transducer may be connected to the plug at a position on the axis of rotation at the other of the two ends.

BRIEF DESCRIPTION OF THE INVENTION

Six embodiments of the invention will now be described by way of example only with reference to the accompanying drawings of which:

Figure 1:
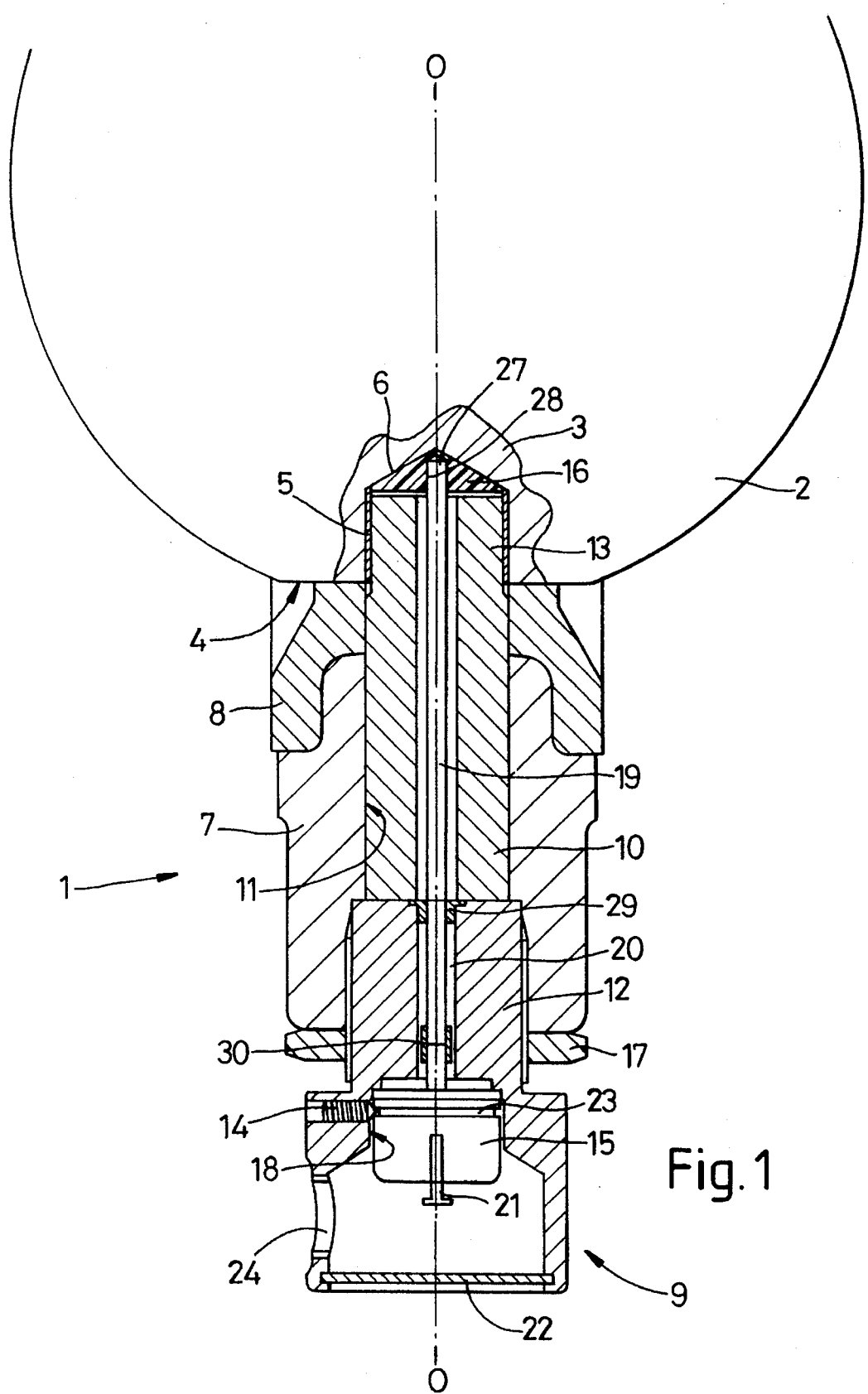
FIG. 1 shows in vertical section a portion of a butterfly valve comprising a stub axle assembly including a transducer comprising a potentiometer.

FIG. 1 shows the first embodiment of the invention, a butterfly valve assembly similar to that described in our aforementioned EP-A-0 493 921, to which reference is made for a better understanding of the first two embodiments of the present invention. In accordance with the present invention the lower valve disc mounting of EP-A-0 493 921 A1 is replaced with lower mounting I described herein. It will of course be appreciated that any suitable valve assembly may be similarly adapted.

A generally circular valve disc 2 has a boss 3 (a partial section of which is shown) with a flat lower surface 4 at the periphery of the disc 2 which rests upon the lower mounting 1. A blind bore or socket 5 extends in to the boss 3 perpendicular to the surface 4 and coaxial with the valve disc's rotational axis. A closed end of the socket 5 is provided by a frusto-conical formation 6 while the remainder is provided by a smooth cylindrical bore.

The lower mounting 1 comprises a portion 7 of the valve body, a primary seal 8 disposed between portion 7 and flat surface 4, and a stub axle assembly 9.

The assembly 9 comprises a stepped cylindrical shaft 10 axially adjustable along a bore 11 in the body portion 7 by a screw-threaded mounting plug 12 on which the shaft 10 sits. The bore 11 which also extends through the seal 8 is coaxial with the rotational axis 0—0 of the valve disc 2. A reduced diameter end region 13 of the shaft 10 extends inwardly from the seal 8 into the socket 5. This end region 13 provides a stub axle about and on which the valve disc 2 is free to rotate. Axial adjustment by rotation of the mounting plug 12 enables the flat surface 4 of disc 2 to be located accurately against the seal 8 whilst the weight of the disc may be taken by the stub axle 13.

Associated with the components of the stub axle assembly 9 already described is position sensor apparatus for monitoring the rotational position of the valve disc 2. This apparatus comprises the mounting plug 12 attached to the valve body portion 7, a rotary potentiometer 15 received by the plug 12, and a plastics flexible coupling 16 adhered to the frusto-conical end region of the socket 5 to a blind hole formed therein, coaxial with the socket 5. As described above, the mounting plug 12 is screw-threaded into the valve body portion 7 for axial adjustment and is lockable in position by lock nut 17. A stepped through bore 18 in the mounting plug 12 receives the body of the rotary potentiometer 15 which is retained by grub screws 14 acting upon a groove 23 on the exterior of the potentiometer 15. The spindle 19 of the rotary potentiometer 15 extends through coaxial clearance bores 20 in both the mounting plug 12 and the shaft 10 and its free end 27 is received as an interference fit in a blind bore 28 formed in the flexible coupling 16. The spindle is located by means of a collar 29 provided at the end of the mounting plug 12 adjacent the shaft 10.

It will be appreciated that the potentiometer spindle 19 is free to rotate in the bore 20 and that it rotates together with the valve disc 2. To ensure accurate alignment relative to the bore 20, means in the form of a tube 30 on which two parts of the spindle 19 are an interference fit may be provided which permits both angular and axial adjustment of the potentiometer. In addition one or more additional seals or sealant may be provided in the bore 20 so as to prevent leakage there along should the seal at the flat surface 4 fail. Such an additional seal (not shown) may be provided in a recess (not shown) at the end of the mounting plug adjacent the stub axle and the bore 11 in the body portion 7.

The potentiometer 15 has a pair of contacts 21 (only one shown) covered by a disc 22. To prevent ingress of moisture the space covered by the disc 22 may be backfilled with a suitable sealant such as silicon grease.

Electrical circuitry (not shown) including one or more wires (not shown) which pass(es) through an aperture 24 and sealed by a grommet (not shown) are connected to the contacts 21 of the potentiometer 15 and is used to monitor the rotational position of the valve disc 2. It will be understood that the actuation of the potentiometer 15 by the disc 2 will not be affected by wear in either the valve actuating mechanism (not shown or described) or by increased play between the stub axle 13 and socket 5.

Figure 2:
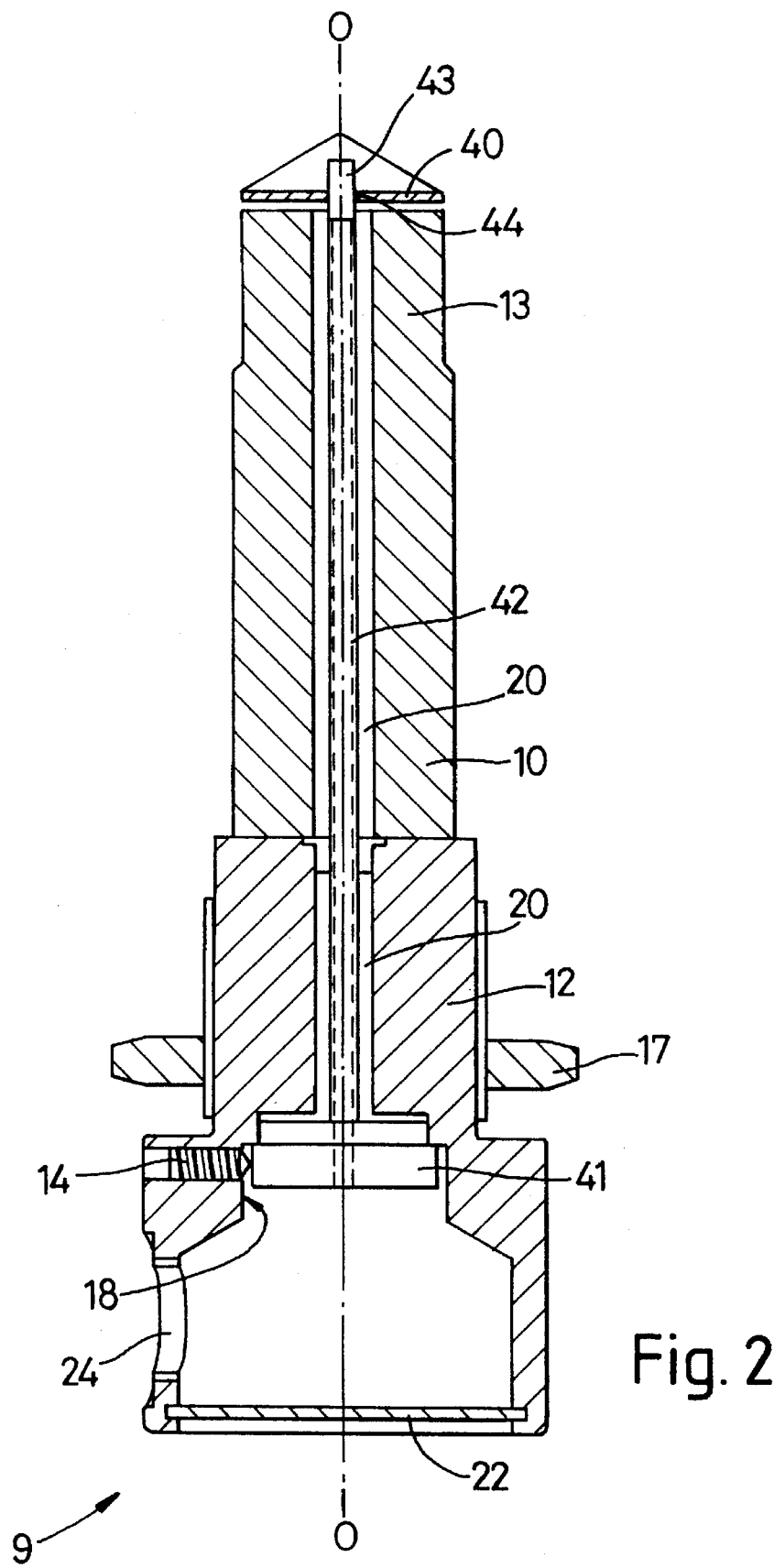
FIG. 2 shows in vertical section a portion of a stub axle assembly of a butterfly valve, including a transducer comprising a Hall effect device.

The second embodiment of the invention, a butterfly valve assembly, part of which is shown in FIG. 2, is similar to that of the first embodiment, and the same reference numerals will be used for corresponding structural features. FIG. 2 shows a stub axle assembly 9 similar to that shown in FIG. 1. FIG. 2 does not show the disc 2, part of the valve body 7 or the seal 8, all of which are shown in FIG. 1 and are the same in this embodiment.

As can be seen in FIG. 2 the assembly 9 comprises a shaft 10, a mounting plug 12 with lock nut 17 all of which are the same as in FIG. 1.

A magnetic disc or annulus 40 is fixed by adhesive in the socket on the valve disc. The magnetic disc or annulus 40 may be wholly magnetic or may have separate spaced apart sectors of magnetic material.

The stepped through bore 18 in the mounting plug 12 receives the sensor adjustment mechanism 41 of a Hall effect device which is retained by grub screws 14, the mechanism replacing the potentiometer 15 of the first embodiment. A tubular spindle 42, which replaces the solid spindle 19 of the first embodiment extends from the sensor mechanism 41 through the clearance bores 20 in the mounting plug 12 and the shaft 10. The spindle has a free end, in which is mounted a sensor 43 of the Hall effect device, encapsulated for added protection. The sensor 43 is preferably located in a central hole 44 in the magnetic disc or annulus 40 and is connected to the adjuster mechanism 41 by wires (not shown) passing through the tubular spindle 42 and out to an appropriate connector and display device (not shown).

The tubular spindle 42 is fixed relative to the movement of the magnetic disc or annulus 40 so that once initial calibration has been made the only relative movements of the sensor and magnetic disc or annulus are those caused by rotation of the valve disc relative to the valve body.

Although a rotary potentiometer 15 is the electrical transducer chosen for use in the first embodiment, and a Hall effect device is the transducer chosen for use in the second, it will be appreciated that any suitable transducer actuated by rotation of the valve disc relative to the valve body may be used. Also, in the first embodiment the spindle 19 of the potentiometer is wholly independent from the shaft 10 although in another embodiment of the invention it may be desired that spindle 19 and shaft 10 are integrally formed.

Figure 4:
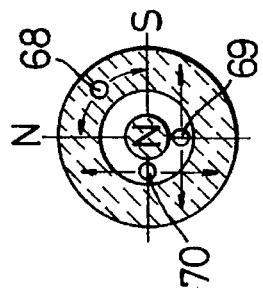
FIG. 4 shows a partial view of part of the ball valve shown in FIG. 3.
Figure 5:
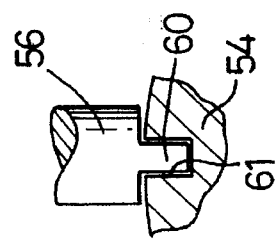
FIG. 5 shows a cross-section on line V—V of FIG. 3.
Figure 3:
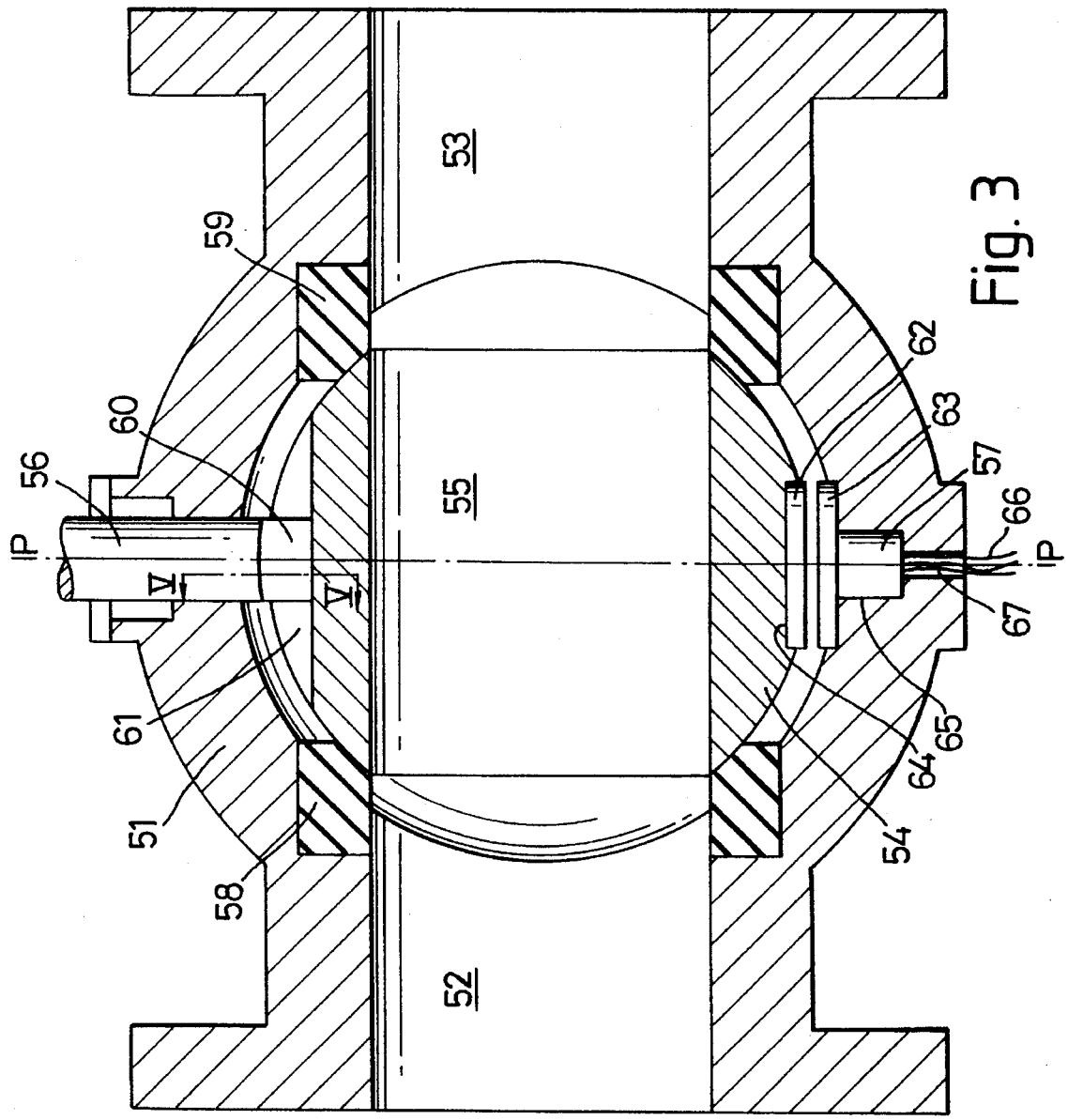
FIG. 3 shows a cross-section through a ball valve in accordance with the third embodiment of the invention.

As shown in FIGS. 3, 4 and 5 the ball valve of the third embodiment comprises a valve body 51 having an inlet port 52 and an outlet port 53, an obturator in the form of a ball 54 which has a passageway 55 therethrough, a drive shaft 56 and a transducer 57. In the open position of the valve as shown the passageway 55 connects the inlet port 52 and the outlet port 53.

The ball 54 of the valve is of generally conventional construction and is positioned between two seals 58 and 59 which surround the inner extremities of the ports 52 and 53 respectively. The ball is rotatable about an axis P-P by means of the drive shaft 56 having a tang 60 at its end which seats in a slot 61 in the ball. This arrangement allows the ball to move slightly transversely of the axis P—P under the pressure of the material (line pressure) in the valve, but still to be rotated by an actuator (not shown) positioned at the end of the drive shaft further from the ball.

The valve is provided with a transducer 57 which in this embodiment comprises a ring shaped magnet 62 and a sensor 63 comprising a plurality of Hall effect devices. The magnet 62 is securely mounted in a recess 64 formed in the ball diametrically opposite the drive shaft. The sensor is mounted in a recess 65 formed on the interior of the body 51 and close to the magnet 62 (see FIG. 3). The sensor 62 comprises a plurality of Hall effect devices spaced apart about the rotational axis P—P. The Hall effect devices are connected via conducting wires 66 through a hole in the valve body to suitable circuitry including one or more indicating devices which show the actual position of the ball 54 relative to the axis P—P. Suitable seals (not shown) are provided to prevent leakage past the sensor 63.

Because the sensor 63 comprises a plurality of Hall effect devices it is capable of providing an indication not only of the angular position of the ball 54 but also of any transverse displacement away from the axis P—P e.g. in a direction parallel to the material flow through the valve and perpendicular to the axis P—P, and/or in a direction perpendicular to the material flow and perpendicular to the axis P—P. In this specific embodiment three Hall effect devices 68,69 and 70 are provided in the positions shown in FIG. 4 and facing the magnet 62. As indicated in the drawing one sensor 68 is capable of sensing 90° of movement between the fully open and fully closed positions of the valve as the ball is rotated through 90°, the sensor moving from a position adjacent a north pole to a position adjacent a south pole of the magnet. The two other sensors 69 and 70 are capable of sensing linear (and rotational) movement of the ball, the linear directions being perpendicular to and parallel to the line of flow. However, other magnet and sensor arrangements are possible.

The advantage of this embodiment is that the transducer i.e. the sensor 63 and magnet 62, is largely unaffected by chemical reactions normally requiring the use of ball valves. The sensor can therefore be provided in the valve and operate under process conditions without the seals and protection required by most other forms of transducers. The output can be passed externally via a hermetic seal, which because it is incorporated in the valve when first assembled, can be tested and certified to the standards required. The lack of any mechanical linkage between the magnet and the sensor or indicating means almost eliminates the likelihood of drive failures indicating erroneous valve positions.

Figure 6:
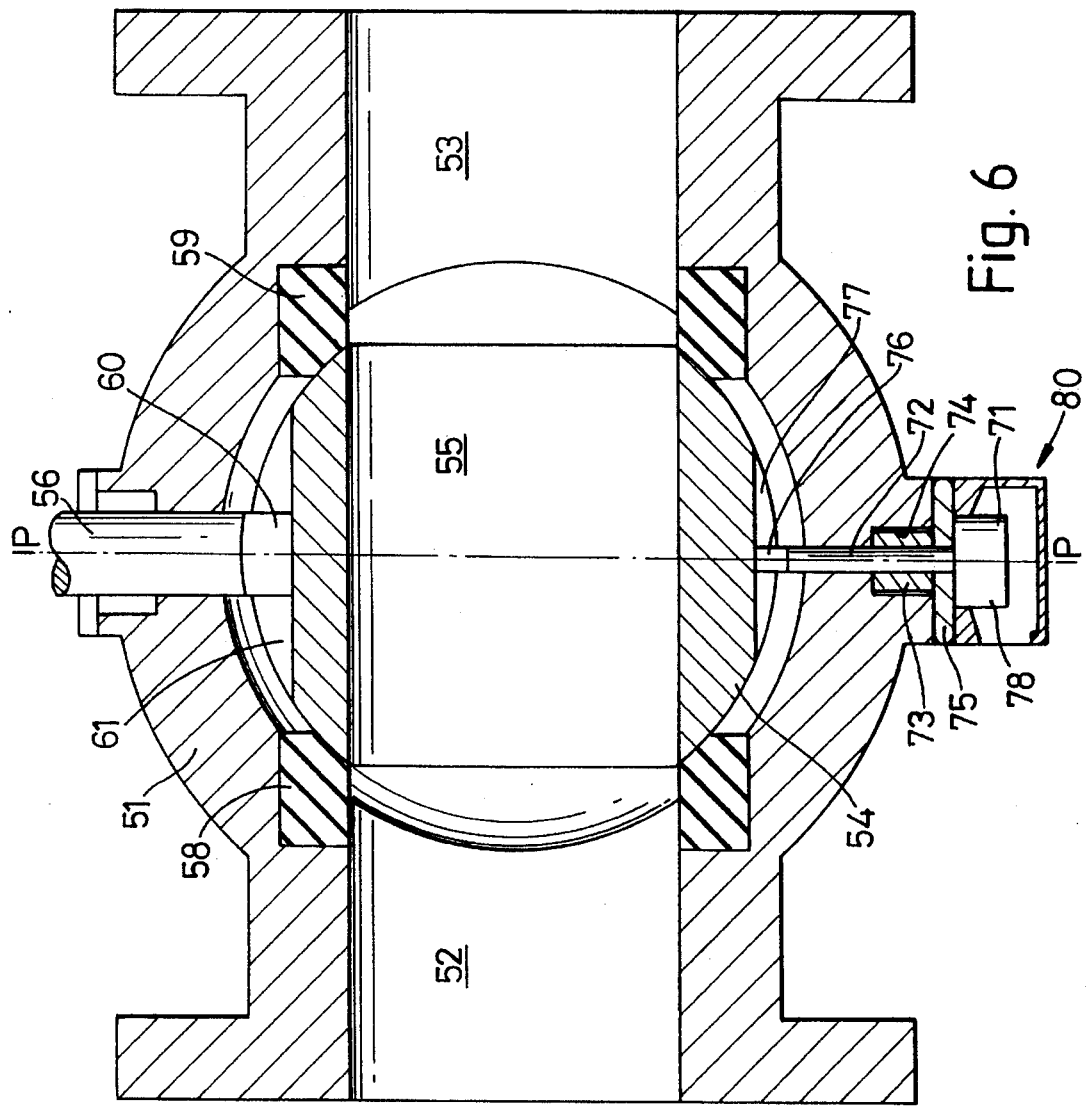
FIG. 6 shows a cross-section through a ball valve in accordance with a fourth embodiment of the invention.

The fourth embodiment of the invention shown in FIG. 6 comprises a ball valve of similar construction to that shown in FIG. 3 and will not be described again in detail. The same reference numerals have been used in FIG. 6 for corresponding features and components in FIG. 3. The valve of the fourth embodiment is provided with a transducer assembly 80 for monitoring the angular position of the ball 54. The transducer assembly comprises a rotary potentiometer 71 having a shaft 72 which passes freely through a screw-threaded plug 73 forming part of the transducer assembly, positioned within a screw-threaded bore 74 in the valve body. A lock nut 75 is provided to maintain the position of the plug in the bore 74. Suitable seals (not shown) are also provided. The shaft 72 of the potentiometer is formed with a tang 76 which seats in a slot 77 in the ball, diametrically opposite the slot 61 for receiving the tang 60 of the drive shaft 56. The potentiometer is connected by wires 78 into an electric circuit (not shown) including an appropriate indicating device (not shown). The construction of the transducer assembly is similar to the transducer assembly described in relation to the first embodiment and illustrated in FIG. 1.

Figure 7:
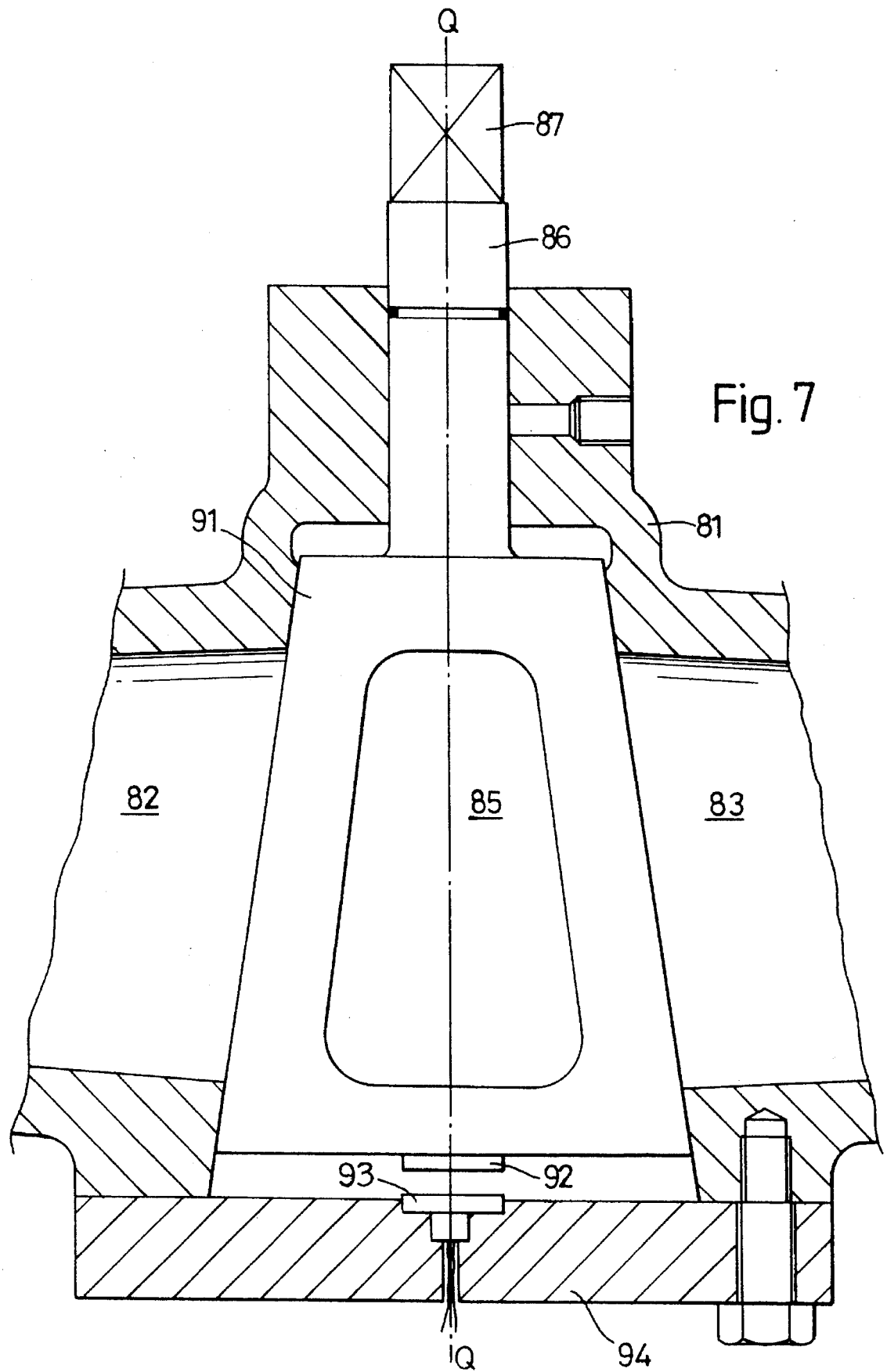
FIG. 7 shows a cross-section through a tapered plug valve in accordance with the fifth embodiment of the invention.

The fifth embodiment of the invention, shown in FIG. 7, comprises a tapered plug valve consisting of a valve body 81, an inlet port 82, an outlet port 83, a tapered plug 91 positioned in a tapered bore in the valve body 81, the tapered plug having a port 85 passing therethrough and connecting ports 82 and 83 in the open position. The obturator i.e. the plug 91 may be rotated about axis Q—Q by means of an actuator (not shown) connected to a square end 87 of a drive shaft 86 integrally connected to the plug 91.

At the lower end of the plug (as shown in FIG. 7) there is provided a transducer comprising a magnet 92 secured in the centre of the wide end of the plug which faces a sensor 93 located in a recess on a cover plate 94 so as to be positioned immediately adjacent the magnet. The construction and arrangement of this transducer is substantially the same as the construction of the transducer described above in relation to the third embodiment and shown in FIG. 3. However, since it is unlikely that a plug 91 will undergo any transverse movement with respect to the axis of rotation only one Hall effect device will be provided so as to indicate the angular movement of the plug.

Figure 8:
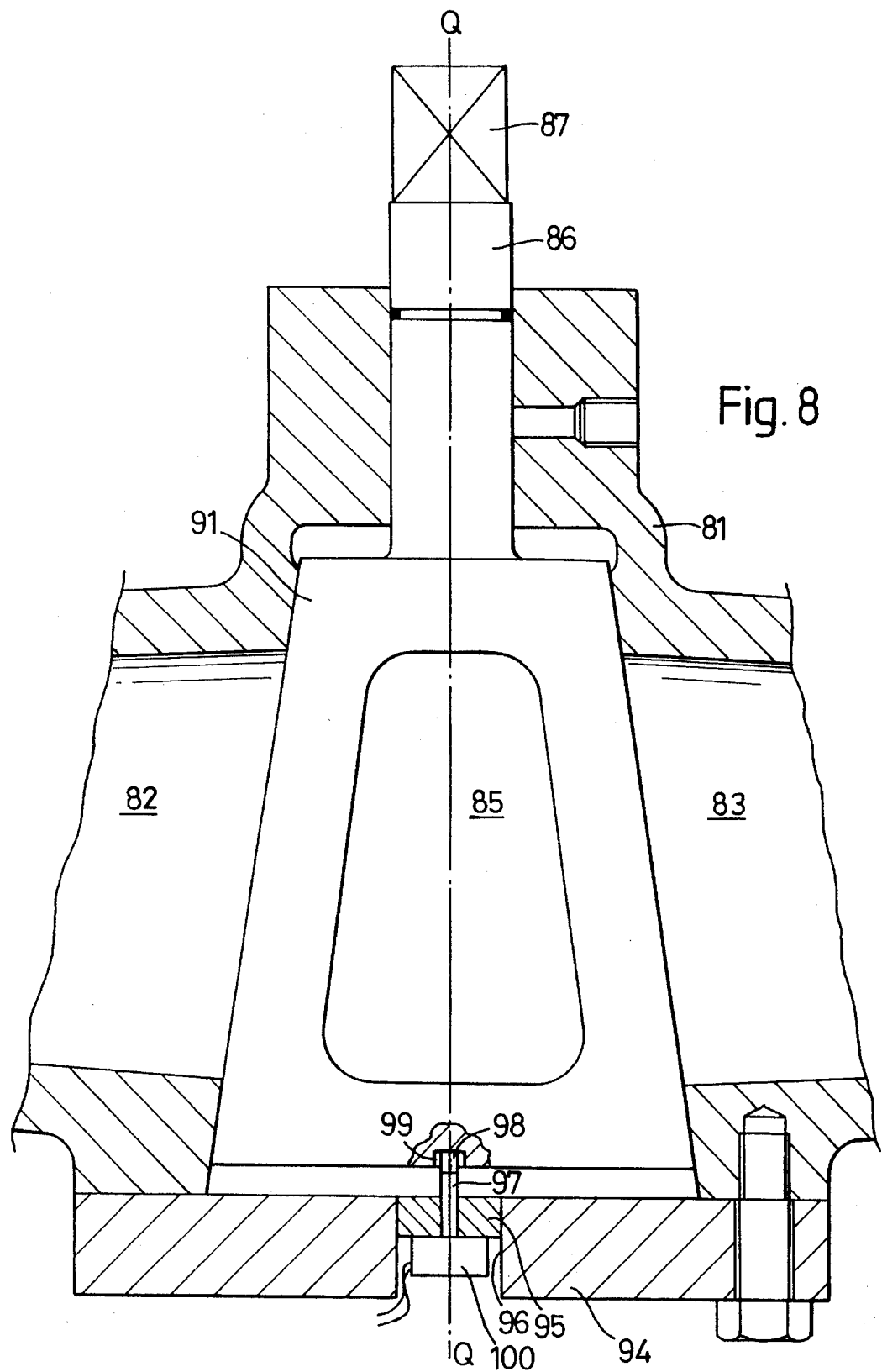
FIG. 8 shows a cross-section through a tapered plug valve in accordance with a sixth embodiment of the invention.

The sixth embodiment of the invention, shown in FIG. 8, also comprises a plug valve having features which are substantially the same as the plug valve of the fifth embodiment. The same reference numerals have been used for corresponding features.

In this sixth embodiment the transducer assembly comprises a rotary potentiometer 100 mounted on a plug 95 which is sealingly engaged in an aperture 96 in the cover plate 94 of the valve body. The rotary potentiometer has a shaft 97 having a tang 98 at its end which seats in a slot 99 formed in the centre of the wide end of the plug 91. This transducer assembly is substantially the same as that described above in relation to the fourth embodiment shown in FIG. 6. The tang at the end of the shaft 97 accurately follows the rotation of the slot 99 but allows for a small axial movement of the plug along the rotational axis Q—Q.

What I claim is:

1. A valve assembly comprising a valve body having a through bore, an obturator rotatably mounted within the body and capable of being rotated between open and closed positions, a stub axle extending from said through bore into a blind bore in said obturator, the outer extent of the through bore being plugged by a mounting plug which the stub axle abuts, and an electrical transducer secured to the valve body and operable on rotation of the obturator, said transducer having a spindle which is connected to the obturator and which is generally coaxial to an axis of rotation of the obturator, the position of said obturator being determined by the effect of said transducer on circuitry electrically connected thereto.

2. A valve assembly according to claim 1 comprising a drive shaft, drivably connected to the obturator, and the transducer is positioned on the opposite side of the obturator to the shaft.

3. A valve assembly according to claim 1 wherein the transducer spindle is attached to the obturator by a flexible coupling.

4. A valve assembly according to claim 1 wherein the transducer is mounted in or on the mounting plug disposed coaxially of the stub axle.

5. A valve assembly according to claim 1 wherein the mounting plug is adjustable axially of the through bore to ensure correct location of the transducer.

6. A valve assembly according to claim 1 wherein the mounting plug is adjustable angularly of the through bore to ensure correct location of the transducer.

7. A valve assembly according to claim 1 comprising a butterfly valve, the obturator comprising a valve disc having a pair of diametrically opposed mounting bosses, each of which is provided with a blind bore open at the periphery of the disc, an actuator being drivably connected to a drive shaft which is non-rotatably received by one of the blind bores and a stub axle being fixed relative to the valve body and extending into the other of the blind bores, the disc being free to rotate on said stub axle and a spindle of the transducer extending through a clearance bore in the stub axle to be attached to the valve disc.

8. A valve assembly according to claim 1 comprising a ball valve, the obturator comprising a ball mounted for rotation about an axis and having a flexible coupling means to a drive shaft, the transducer being connected to or located adjacent to the ball at a position on the axis of rotation diametrically opposite to the coupling.

9. A valve assembly according to claim 1 comprising a tapered plug valve, the obturator comprising a tapered plug having a wide end and a narrow end mounted for rotation about an axis and connected directly to or via a flexible coupling to a drive shaft at one of the two ends, the transducer being connected to or located adjacent to the plug at a position on the axis of rotation at the other of the two ends.

10. A valve assembly according to claim 1 wherein the electrical transducer comprises a rotary potentiometer.

11. A valve assembly according to claim 1 wherein the electrical transducer comprises a Hall effect device.

* * * * *